United States Patent [19]

Yamada et al.

[11] Patent Number: 4,767,683
[45] Date of Patent: Aug. 30, 1988

[54] NON-AQUEOUS ELECTROCHEMICAL CELL

[75] Inventors: Shuji Yamada; Takahisa Ohsaki; Kiyoshi Mitsuyasu, all of Yokohama; Yuichi Sato, Kanagawa; Yoshiyasu Aoki; Kazuya Hiratsuka, both of Tokyo, all of Japan

[73] Assignees: Tokyo Shibaura Denki Kabushiki Kaisha; Toshiba Battery Co., Ltd., both of Kawasaki, Japan

[21] Appl. No.: 129,902

[22] Filed: Dec. 7, 1987

Related U.S. Application Data

[63] Continuation of Ser. No. 829,870, Feb. 18, 1986, abandoned, which is a continuation of Ser. No. 567,931, Jan. 3, 1984, abandoned.

[30] Foreign Application Priority Data

Jan. 14, 1983 [JP] Japan ................................. 58-4537
Jan. 14, 1983 [JP] Japan ................................. 58-4538
Mar. 17, 1983 [JP] Japan ................................. 58-45123
Jul. 19, 1983 [JP] Japan ................................. 58-130154

[51] Int. Cl.$^4$ ........................................... H01M 10/36
[52] U.S. Cl. ..................................... 429/101; 429/42; 429/105
[58] Field of Search ................. 429/101, 105, 42, 196

[56] References Cited

U.S. PATENT DOCUMENTS 4,028,138 6/1977 Dey ..................................... 429/218
4,042,756 8/1977 Geobel et al. ........................ 429/94
4,093,784 6/1978 Driscoll ............................... 429/101
4,233,372 11/1980 Bru et al. ............................ 429/174
4,410,608 10/1983 Goebel et al. ....................... 429/101
4,513,067 4/1985 Kuo et al. ............................ 429/196

FOREIGN PATENT DOCUMENTS 0051440 5/1982 European Pat. Off. .
0064816 11/1982 European Pat. Off. .
0074450 3/1983 European Pat. Off. .
0084381 7/1983 European Pat. Off. .

OTHER PUBLICATIONS

J. Electrochemical Society, vol. 126, No. 12, pp. 2052-2056, Dec. 1979, "Primary Li/SOCL$_2$ Cells" by A. N. Dey.

Primary Examiner—Donald L. Walton
Attorney, Agent, or Firm—Oblon, Fisher, Spivak, McClelland & Maier

[57] ABSTRACT

A non-aqueous electrochemical cell has an anode consisting of an element selected from the group consisting of lithium, sodium and aluminum; a cathode consisting of a porous carbon body and a current collector; and an electrolyte containing an oxyhalide, wherein the porous carbon body contains a carbon black having a structure wherein a thin layer of graphite crystals is formed on a surface of each of chain-like carbon black particles. The cell has a high discharge capacity and an excellent discharge efficiency in high rate discharge.

5 Claims, 4 Drawing Sheets

NON-AQUEOUS ELECTROCHEMICAL CELL

This application is a continuation of application Ser. No. 06/829,870, filed on Feb. 18, 1986, now abandoned which is a continuation of abandoned application, Ser. No. 567,931 filed Jan. 3, 1984.

BACKGROUND OF THE INVENTION

The present invention relates to an improvement in a non-aqueous electrochemical cell.

A non-aqueous electrochemical cell using lithium or sodium as an active anode material has high energy density, good storage characteristics, and wide operation temperature range. A non-aqueous electrochemical cell is therefore often used as a power source for a calculator, a watch, or a memory back up system. Such a cell comprises an anode, an electrolyte and a cathode. In general, such a cell uses as an anode an alkali metal such as lithium or sodium; as an electrolyte or electrolytic solution, a solution of a solute such as lithium perchlorate or lithium tetrafluoroborate in a non-aqueous solvent such as propylene carbonate, γ-butyrolactone, or dimethoxyethane; and as a cathode, manganese dioxide or poly-carbonmonofluoride.

Among such cells, a cell using thionyl chloride as a main active cathode material is receiving a lot of attention due to its high energy density. A cell of this type has a cathode consisting of a porous carbon body and a current collector and has an electrolyte, a solution of lithium chloride (LiCl) and aluminum chloride ($AlCl_3$) in thionyl chloride ($SOCl_2$). Therefore, $SOCl_2$ serves both as the main active cathode material and as the solvent for the electrolyte salt.

In a cell using $SOCl_2$ as an active cathode material, the anode reaction is the reaction in which the anode metal is dissolved in the electrolyte as metal ions. On the other hand, the cathode reaction occurs on the porous carbon body as one constituent member of the cathode, and the reaction product of the cathode reaction is deposited on the porous carbon body. However, in a conventional cell having a cathode comprising a porous carbon body which is obtained by mixing acetylene black with a polymer binder such as polytetrafluoroethylene, forming a resultant mixture into a predetermined shape, and drying the formed body upon deposition of the reaction product on the porous carbon body, the electrode reaction is significantly interfered with and the discharge capacity is lowered. Especially, the discharge efficiency is considerably lowered in a high rate discharge as compared to a low rate discharge.

SUMMARY OF THE INVENTION

It is an object of the present invention to provide a non-aqueous electrochemical cell which has a high discharge capacity and an excellent discharge efficiency in a high rate discharge.

It is another object of the present invention to provide a non-aqueous electrochemical cell which has a high discharge capacity and an excellent discharge efficiency in a high rate discharge, and which has a cathode comprising a porous carbon body having a good size stability.

According to an aspect of the present invention, there is provided a non-aqueous electrochemical cell comprising an anode consisting of an element selected from the group consisting of lithium, sodium and aluminum; a cathode consisting of a porous carbon body and a current collector; and an electrolyte containing an oxyhalide, wherein the porous carbon body contains carbon black having a chain-like structure wherein a thin layer of graphite crystals is formed on a surface of each of carbon black particles.

The porous carbon body can further contain acetylene black.

According to another aspect of the present invention, there is provided a non-aqueous electrochemical cell comprising an anode consisting of an element selected from the group consisting of lithium, sodium and aluminum; a cathode consisting of a porous carbon body and a current collector; and an electrolyte containing an oxyhalide, wherein the porous carbon body has a porosity of 70 to 85%, and the volume of pores having a pore size of 0.1 to 2 μm comprise 30% or more of all pore volume.

According to still another aspect of the present invention, there is provided a non-aqueous electrochemical cell comprising a metal can serving also as one polarity terminal; an anode which is housed in said metal can and which consists of an element selected from the group consisting of lithium, sodium and aluminum; a cathode which is housed in said metal can and which consists of a porous carbon body and a current collector; a separator for physically separating said anode and said cathode in said metal can; metal top hermetically sealed to an open upper end of said metal can; a metal pipe which is inserted in said metal top and which also serves as the other polarity terminal; an electrolyte which contains an oxyhalide and which is introduced into said metal can through said metal pipe; and means for sealing said pipe, wherein a level of the electrolyte contained in said metal can is lower than a lower end of said metal pipe which is in said metal can.

DETAILED DESCRIPTION OF THE PREFERRED EMBODIMENTS

Of various types of carbon materials, a carbon black having a chain-like structure wherein a thin layer of graphite crystals is formed on the surface of each of carbon black particles has an extremely high conductivity and an extremely great specific surface area. Based on this fact, the present inventors have found that when a cathode consisting of a current collector and a porous carbon body containing such a carbon black as a main component is used, a non-aqueous electrochemical cell having excellent discharge characteristics can be obtained.

The cathode as described above can be obtained in the following manner. A polymer binder such as polytetrafluoroethylene is added to the carbon black as described above. After adding an organic solvent such as ethyl alcohol, the resultant mixture is agitated and milled well. The milled substance is applied on a current collector of a metal net, a punched metal, or an expanded metal and is dried thereafter. When the porous carbon body containing as a main component a mixture of the carbon black having a special structure as described above and acetylene black is used, a non-aqueous electrochemical cell which has high discharge capacity and high discharge efficiency in high rate discharge and which has excellent size stability is obtained.

Regarding the mixing ratio of the carbon black having a thin layer of graphite crystals on the surface of each particle and the acetylene black, it is preferable that the carbon black is used in an amount of 20 to 80% by weight and the acetylene black is used in an amount of 80 to 20% by weight.

In a cell according to a first aspect of the present invention, the porosity of the porous carbon body is limited to fall within a predetermined range for the following reasons. When the porosity of the porous carbon body is less than 70%, the reaction efficiency is degraded. On the other hand, when the porosity of the porous carbon body exceeds 85%, the strength of the porous carbon body is degraded. The pore size of pores of the porous carbon body is defined to fall within a predetermined range for the following reasons. When the pore size is less than 0.1 $\mu$m, the pores become clogged by the reaction product of the thionyl chloride as an active cathode material. On the other hand, when the pore size exceeds 2 $\mu$m, the reaction area of the porous carbon body is decreased, resulting in a degradation in the reaction efficiency. The ratio of the volume of pores having a pore size of 0.1 to 2 $\mu$m to the total volume of pores is limited to fall within a predetermined ratio for the following reason. When the ratio is less than 30%, the reaction efficiency cannot be increased satisfactorily.

EXAMPLE 1

The present invention will now be described with reference to a case of a lithium-thionyl chloride cell.

Figure 1:
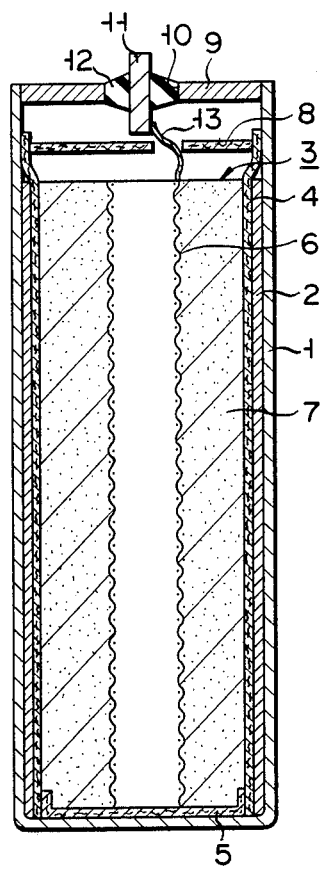
FIG. 1 is a cross-sectional view of a lithiumthionyl chloride cell according to Example 1 of the present invention.

FIG. 1 shows a cross-sectional view of a cell of R03 size. Referring to FIG. 1, reference numeral 1 denotes a metal can (10 mm outer diameter, 42 mm height) of stainless steel which also serves as an anode terminal and which has an open upper end. A cylindrical anode 2 of metal lithium (0.6 mm thickness) is fitted inside the metal can 1. A cathode 3 is arranged inside a glass fiber separator 4 which is arranged inside the anode 2. An insulating sheet 5 is interposed between the bottom surfaces of the cathode 3 and the metal can 1. The cathode 3 consists of a current collector 6 of a stainless steel net and a cylindrical porous carbon body 7. The cathode 3 is prepared by mixing 90% by weight of a carbon black having a chain-like structure wherein a thin layer of graphite crystals is formed on the surface of each of carbon black particles ("Ketjenblack EC": Trade name of Lion Akzo Co., Inc.) and 10% by weight of polytetrafluoroethylene; adding ethanol to the mixture; milling the mixture; forming the milled substance into a cylindrical shape (8 mm outer diameter, 3 mm inner diameter, and 35 mm height) such that the current collector faces inward; and drying the assembly in vacuo at 150° C. Thus, the cathode 3 is obtained wherein the cylindrical porous carbon body 7 is formed around the current collector 6.

An insulating layer sheet 8 is supported by the separator 4 to be above the cathode 3 inside the can 1. A metal top 9 is sealed to the open upper end of the can 1 by laser welding or the like. A hole 10 is formed at the center of the metal top 9. An electrolyte comprising a 1.8 mol/l solution of lithium tetrachloroaluminate (LiAlCl$_4$) in thionyl chloride (SOCl$_2$) is injected into the metal can 1 through the hole 10. A cathode terminal 11 is fixed in the hole 10 of the metal top 9 by means of a metal-glass sealing material 12 and is electrically insulated from the metal top 9. The cathode terminal 11 is connected to the current collector 6 of the cathode 3 by a lead wire 13 mounted at the lower end of the terminal 11.

COMPARATIVE EXAMPLE 1

A lithium-thionyl chloride cell of R03 size having the same structure as that of Example 1 was prepared following the same procedures as in Example 1 except that acetylene black was used as carbon black.

Figure 2:
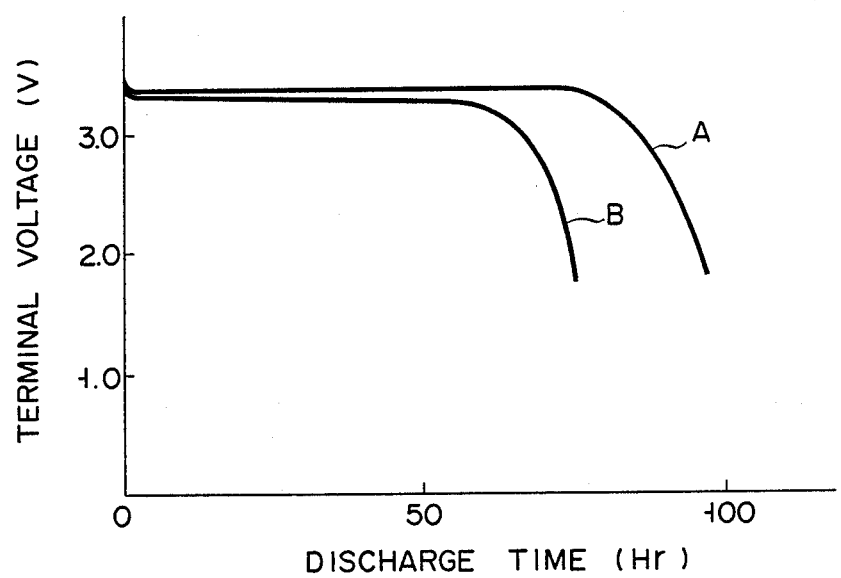
FIG. 2 is a graph showing the relationship between the terminal voltage and discharge time in a cell of Example 1 and Comparative Example 1.

The cells of Example 1 and Comparative Example 1 were examined for their characteristic of 300 $\Omega$ constant load discharge at room temperature. The characteristic curves as shown in FIG. 2 were obtained. Curve A in FIG. 2 is a discharge characteristic curve of the cell of Example 1 and curve B shows the same of the cell of Comparative Example 1. As may be apparent from FIG. 2, the cell (curve A) of Example 1 has significantly longer discharge time than that (cell B) of Comparative Example 1 and higher discharge voltage than that of Comparative Example 1. The cell of Example 1 of the present invention is assumed to provide such good discharge characteristics for the following reason. The porous carbon body of the cathode contains as its main component a carbon black in which a thin layer of graphite crystals is formed on the surface of each of chain-like particles. Therefore, the conductivity and the reaction surface area of the cathode are considerably improved.

In Example 1 above, a cylindrical cathode is used. However, the present invention is not limited to this. For example, a milled substance of a carbon black and a polymer binder may be applied on a metal current collector to provide a belt-like electrode, and the belt-like electrode can be wound and dried to provide a spiral cathode.

EXAMPLE 2

Figure 3:
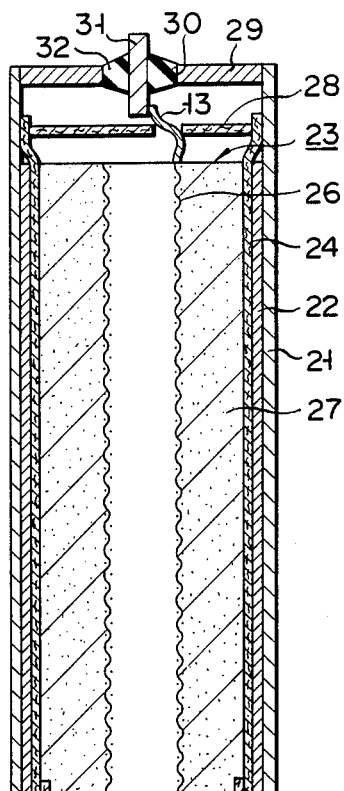
FIG. 3 is a cross-sectional view showing a lithium-thionyl chloride cell according to Example 2 of the present invention.

FIG. 3 shows a cross-sectional view of a cell of R6 size. Referring to FIG. 3, reference numeral 21 denotes a metal can (14 mm outer diameter, 47 mm height) of stainless steel, which also serves as an anode terminal, and which has an open upper end. A cylindrical anode 22 of metal lithium (0.75 mm thickness) is applied on the inner circumferential surface of the metal can 21. A cathode 23 is arranged inside a glass fiber separator 24. An insulating sheet 25 is interposed between the bottom surfaces of the cathode 23 and the metal can 21.

The cathode 23 is prepared by the following method. A mixture is prepared by mixing 45% by weight of a carbon black having a chain-like structure wherein a thin layer of graphite crystals is formed on the surface of each of carbon black particles ("Ketjenblack EC": Trade name, Lion Akzo Co., Inc.), 45% by weight of acetylene black, and 10% by weight of a powder of polytetrafluoroethylene; adding ethanol to the resulant mixture in a ratio of 8 ml per gram of the mixture; and sufficiently milling the mixture. The milled substance is formed into a cylindrical shape (10 mm outer diameter, 6 mm inner diameter, and 38 mm height) together with a current collector 26 comprising a nickel net such that the current collector 26 faces inward. The formed body is dried in vacuo at 200° C. to provide the cathode 23 wherein a cylindrical porous carbon body 27 is applied on the outer circumferential surface of the current collector 26.

An insulating paper sheet 28 with a hole is supported by the separator 24 to be located above the cathode 23 in the metal can 21. A metal top 29 is sealed to the open upper end of the metal can 21 by laser welding or the like. A hole 30 is formed at the center of the metal top 29. An electrolyte comprising a 1.8 mol/l solution of lithium tetrachloroaluminate ($LiAlCl_4$) in thionyl chloride ($SOCl_2$) is injected into the metal can 21 through the hole 30 of the metal top 29. A cathode terminal 31 is fixed in the hole 30 of the metal top 29 by means of a metal-glass sealing material 32 and is electrically insulated from the metal top 29. The lower end of the cathode terminal 31 is connected to the current collector 26 of the cathode 23 by a lead wire 13.

EXAMPLE 3

A lithium-thionyl chloride cell of R6 size having the same structure as that of Example 1 was assembled using the same cathode as that in Example 1 except that a mixture used consisted of 25% by weight of "Ketjenblack EC" (Lion Akzo Co., Inc.), 65% by weight of acetylene black, and 10% by weight of a powder of polytetrafluoroethylene.

COMPARATIVE EXAMPLE 2

A lithium-thionyl chloride cell of R6 size having the same structure as that of Example 1 was assembled using a cathode as in Example 1 except that a mixture used consisted of 90% by weight of acetylene black and 10% by weight of a powder of polytetrafluoroethylene.

One hundred, each, of the cells of Examples 2 and 3 and Comparative Example 2 were prepared. The diameters of these cells before and after drying were measured, and the results as shown in the Table below were obtained. The Table also shows the number of cathodes which exhibited separation or peeling off of the porous carbon body from the current collector and the number of cathodes which could not be inserted into metal cans due to expansion of the porous carbon body.

As may be seen from the Table above, the cathodes of the cells of Examples 2 and 3 indicate only small changes in size and are rarely susceptible to the problems of a defective porous carbon body or the impossibility of inserting the cathode into a metal can due to expansion of the porous carbon body. In contrast to this, a number of cathodes in the cells of Comparative Example 2 suffered significant variations in size after drying and could not be inserted into metal cans.

Figure 4:
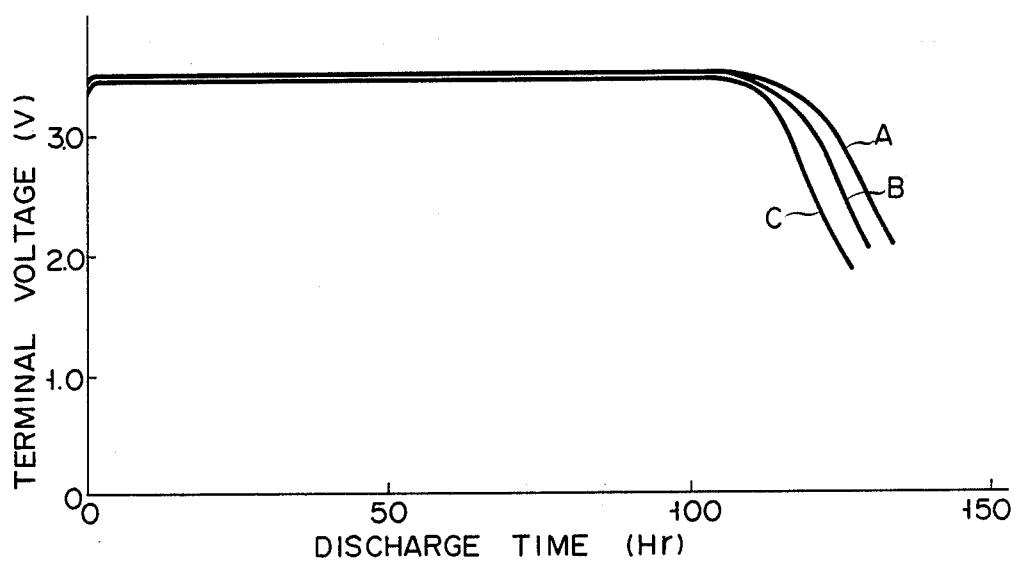
FIG. 4 is a graph showing the relationship between the terminal voltage and discharge time of cells of Examples 2 and 3 and Comparative Example 2.

Cells of Examples 2 and 3 and Comparative Example 2 were examined for their characteristics of 300 Ωload discharge at room temperature. FIG. 4 shows the obtained characteristics. Referring to FIG. 4, curve A represents a discharge characteristic curve of the cell of Example 2, curve B represents the same of the cell of Example 3, and curve C represents the same of the cell of Comparative Example 2. As may be seen from FIG. 4, the cells of Examples 2 and 3 have longer discharge time and higher discharge voltage than those of the cell (Comparative Example 2) having a cathode comprising a porous carbon body containing acetylene black alone as a main component.

EXAMPLE 4

Figure 5:
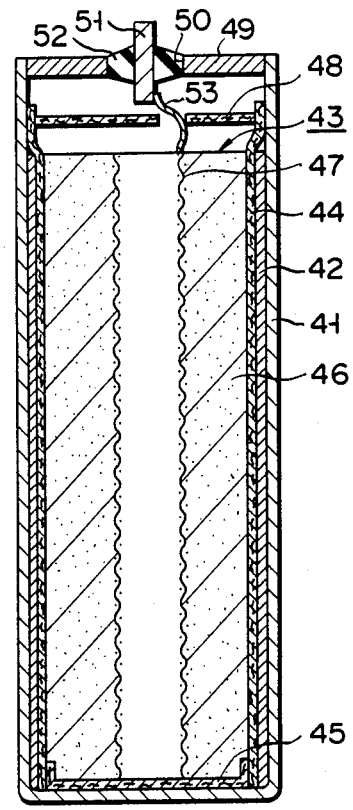
FIG. 5 is a cross-sectional view showing a lithium-thionyl chloride cell according to Example 4 of the present invention.

After adding polytetrafluoroethylene in an amount of 10% by weight to a mixture consisting of 45% by weight of acetylene black and 45% by weight of "Ketjenblack EC" (Lion Akzo Co., Ltd.) having an average particle size of 40 mμm and a DBP absorption of 200 $cm^3$/100 g, ethanol was added to the resultant mixture and milling was performed. As shown in FIG. 5, the milled substance was formed into a cylindrical body (10.5 mm outer diameter, 5 mm inner diameter, and 38 mm height) together with a current collector 47 comprising a stainless steel net such that the current collector 47 faces inward. The cylindrical body was dried in vacuo at 150° C. Thus, a cathode 43 was obtained in which a cylindrical porous carbon body 46 was adhered to the outer circumferential surface of the current collector 47. The porous carbon body 46 of the cathode 43 had a porosity of 80%. When the pore distribution of the porous carbon body 46 was examined by the mercury injection method, 37% of the total pore volume is found to be consisted by the pores having a diameter falling within the range of 0.1 to 2 μm . Subsequently, the cathode 43 was arranged inside a separator 44 in a metal can 41 of stainless steel having an outer diameter of 14 mm and a height of 47 mm, in which a cylindrical anode 42 having a thickness of 0.7 mm and consisting of metal lithium was adhered to the inner circumferential surface thereof. After assembling an insulating paper sheet 48 and sealing the metal can 41 with a metal top 49, an electrolyte was injected into the metal can 41 through a hole 50 formed in the metal top 49. The electrolyte consisted of a 1.8 mol/l solution of lithium tetrachloroaluminate ($LiAlCl_4$) in thionyl chloride ($SOCl_2$).

A cathode 51 connected to the current collector 47 through a lead wire 53 was fixed in the hole 50 of the

TABLE

| | Average cathode diameter (mm) | | Number of cathodes prepared | | |
|---|---|---|---|---|---|
| | | | | No. of unsatisfactory cathodes | |
| | Before drying | After drying | No. of satisfactory cathodes | Separation of porous carbon body | Could not be inserted into metal can |
| Example 2 | 10 | 10 | 99 | 1 | 0 |
| Example 3 | 10 | 10.2 | 100 | 0 | 0 |
| Comparative Example 2 | 10 | 11 | 86 | 0 | 14 | metal top 49 by means of a sealing material 52. A lithium-thionyl chloride cell of R6 size was thus assembled as shown in FIG. 5. In FIG. 5, reference numeral 45 denotes an insulating paper sheet interposed between the bottom surfaces of the cathode 43 and the metal can 41.

EXAMPLE 5

A cathode was prepared using a carbon black ("VULCAN XC-72R" available from Cabot Corp.) having an average particle size of 30 m$\mu$m and a DBP oil absorption of 185 cm$^3$/100 g, following the same procedures as in Example 4. The porous carbon body of the cathode had a porosity of 82%, and the volume of pores having a pore size of 0.1 to 2 $\mu$m comprised 34% of the total pore volume. Using this cathode, a lithium-thionyl chloride cell as shown in FIG. 5 was assembled following the same procedures as in Example 4.

COMPARATIVE EXAMPLE 3

A cathode was prepared using a carbon black ("ELFTEX 8" available from Cabot Corp.) having an average particle size of 30 m$\mu$m and a DBP oil absorption of 100 cm$^3$/100 g, following the same procedures as in Example 4. Using this cathode, a lithium-thionyl chloride cell having the same structure as shown in FIG. 5 was assembled. The porous carbon body of the cathode had a porosity of 84%, and the volume of pores having a pore size of 0.1 to 2 $\mu$m had 24% of the total pore volume.

Figure 6:
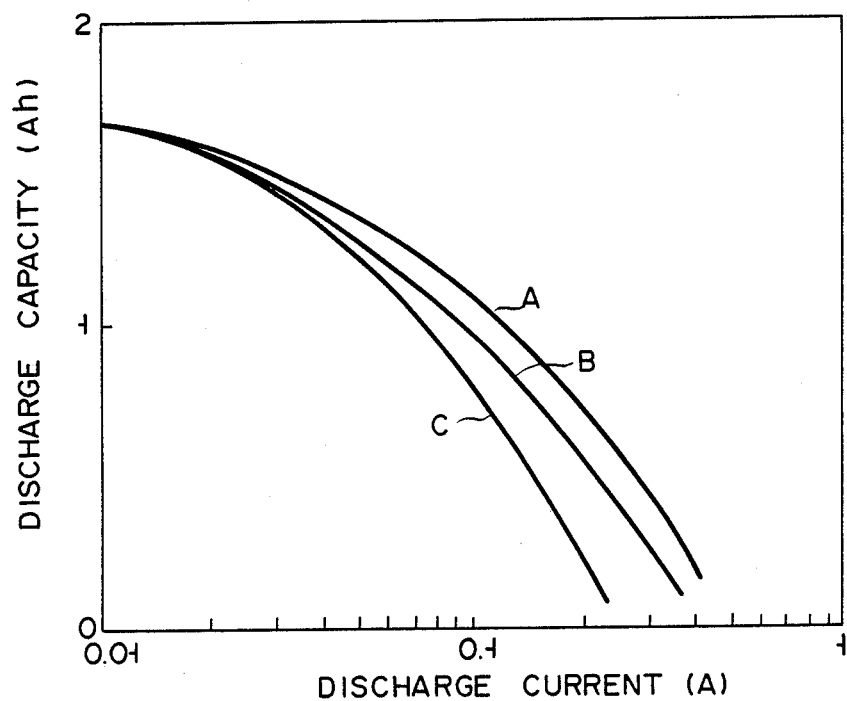
FIG. 6 is a graph showing the relationship between the discharge capacity and discharge current in a cell of Examples 4 and 5 and Comparative Example 3.

The cells of Examples 4 and 5 and Comparative Example 3 were examined for the relationship between the discharge current and discharge capacity to end voltage of 2.5 V. The characteristics as shown in FIG. 6 were obtained. Referring to FIG. 6, curve A represents the discharge current vs. discharge capacity characteristics of the cell of Example 4, curve B represents the same of the cell of Example 5, and curve C represents the same of the cell of Comparative Example 3. As may be seen from FIG. 6, the cells of the present invention (curves A and B) have substantially an equivalent discharge capacity to that of the conventional cell (curve C) in low rate discharge but have an extremely higher discharge capacity in high rate discharge.

EXAMPLE 6

Figure 7:
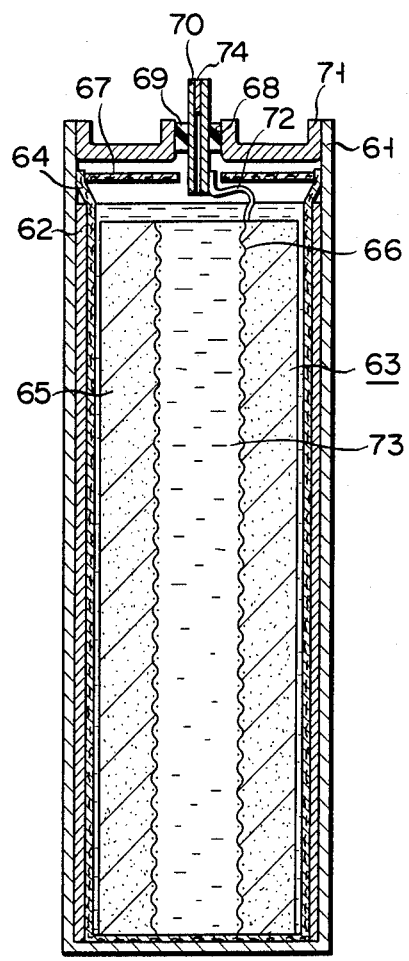
FIG. 7 is cross-sectional view of lithium-thionyl chloride cells according to Example 6 of the present invention.

As shown in FIG. 7, a stainless steel metal can 61 was prepared which had an outer diameter of 14 mm, a height of 47 mm and a thickness of 0.3 mm, which had an open upper end, and which also served as an anode terminal. A cylindrical anode 62 having a thickness of 0.7 mm and consisting of metal lithium was placed inside the metal can 61.

A cathode 63 was placed inside a cylindrical glass fiber separator 64. The cathode 63 was prepared by the following method. A dispersion of polytetrafluoroethylene (binder) was added in an amount (in terms of polytetrafluoroethylene) of 10% by weight to a mixture of 45% by weight of "Ketjenblack EC" available from Lion Akzo Co., Inc. and 45% by weight of acetylene black. The mixture was milled, and formed to provide a cylindrical porous carbon body 65 having an outer diameter of 12 mm, an inner diameter of 5 mm, and a height of 40 mm. A cylindrical current collector 66 consisting of nickel expanded metal was placed inside the porous carbon body 65. An insulating sheet 67 was supported by the separator 64 above the cathode 63 in the metal can 61.

A metal top 71 was prepared which had a hole 68 at its center for receiving a stainless steel pipe 70 as a cathode terminal by a glass sealing material 69. After connecting the pipe 70 to the current collector 66 of the cathode 63 housed in the metal can 61 by a nickel lead wire 72, the metal top 71 was hermetically sealed to the open upper end of the metal can 61 by laser welding. Thereafter, 3.5 ml of a 1.8 mol/l solution (electrolyte) 73 of lithium tetrachloroaluminate (LiAlCl$_4$) in thionyl chloride were injected into the metal can 61 through the pipe 70 such that the electrolyte 73 was contained in the metal can 61 to the level lower than the lower end of the pipe 70. A sealing needle 74 was inserted into the pipe 70, and the pipe 70 and the needle 74 were welded by laser welding to seal the pipe 70. A lithium-thionyl chloride cell was thus prepared.

COMPARATIVE EXAMPLE 4

A lithium-thionyl chloride cell was prepared following the same procedures as in Example 6 except that after sealing a metal top to an open upper end of a metal can, 4.3 ml of a 1.8 mol/l solution (electrolyte) of lithium tetrachloroaluminate in thionyl chloride were injected into the metal can through a stainless steel pipe to the level higher than the lower end of the stainless steel pipe.

One thousand cells of each of Example 6 and Comparative Example 4 were prepared. The obtained cells were tested by means of a helium leak detector to determine the number of cells in which the stainless steel pipes were not satisfactorily sealed. The results as shown in the Table below were obtained.

TABLE

|  | Number of unsatisfactorily sealed cells per 1,000 cells |
| --- | --- |
| Example 6 | 18 |
| Comparative Example 4 | 56 |

As may be seen from the above Table, when the electrolyte is contained in the metal can to the level lower than the lower end of the stainless steel pipe, the rate of occurrence of unsatisfactory sealing can be considerably reduced. Furthermore, when the pipe is sealed by laser welding, generation of a mist of the electrolyte can be prevented, so that the working environment is not contaminated and the manufacturing apparatus is not damaged.

In Example 6, before the electrolyte is injected into a metal can to the level lower than the lower end of a metal pipe, the volume of the metal can housing the cathode therein is measured, and the proper amount of electrolyte is injected into the metal can. However, the present invention is not limited to this. For example, the electrolyte can be injected into a metal can to the level lower than the lower end of a metal pipe by roughly estimating the volume of a metal can, injecting a corresponding amount of electrolyte into the metal can, and heating the metal can so as to spill off any extra amount of electrolyte (corresponding to the electrolyte portion above the lower end of the metal pipe) through the metal pipe.

In Example 6, the metal pipe is sealed by inserting a pin into the metal pipe and laser welding the pin and the metal pipe. However, the present invention is not limited to this. For example, the metal pipe can be directly laser welded without inserting a pin therein. Furthermore, welding is not limited to laser welding and can be electric welding or arc welding.

What is claimed is:

1. A non-aqueous electrochemical cell, comprising:
   an anode consisting of an element selected from the group consisting of lithium, sodium and aluminum;
   a cathode consisting of a porous carbon body and a current collection; and
   an electrolyte containing an oxyhalide, wherein the porous carbon body contains 50 to 80% by weight of a carbon black having a chain-like structure and 20 to 50% by weight of an acetylene black, and has a porosity of at least 70%, the volume of pores having a pore size of 0.1 to 2 $\mu$m occupies not less than 30% of the total pore volume, and a thin layer of graphite crystals is formed on the surface of each of said carbon black particles having a chain-like structure.

2. The cell according to claim 1, wherein the anode consists of lithium.

3. The cell according to claim 1, wherein the oxyhalide is thionyl chloride.

4. A non-aqueous electrochemical cell, comprising:
   a metal can which serves as one polarity terminal of said cell and which houses the anode and the cathode of said cell, said anode being an element selected from the group consisting of lithium, sodium and aluminum and said cathode being a porous carbon body containing 50 to 80% by wt. of a carbon black having a chain-like structure wherein a thin layer of graphite crystals is formed on the surface of each of said carbon black particles and 20 to 50% by wt. of an acetylene black, said porous carbon body having a porosity of at least 70%, and a volume of pores having a pore size of 0.1 to 2 $\mu$m occupying not less than 30% of the total pore volume,
   a separator for physically separating said anode and said cathode in said metal can;
   a metal top hermetically sealing an open upper end of said metal can;
   a metal pipe which is inserted in said metal top and which serves as the remaining polarity terminal of said cell and through which an electrolyte containing an oxyhalide is introduced into said metal can; and
   means for sealing said pipe, wherein the level of said electrolyte present in said metal can is lower than the lower end of said metal pipe which is in said metal can.

5. A non-aqueous electrochemical cell, comprising:
   a metal can which serves as the anode terminal of said cell and which houses the anode and the cathode of said cell, said anode being an element selected from the group consisting of lithium, sodium and aluminum and said cathode being a porous carbon body containing 50 to 80% by wt. of a carbon black having a chain-like structure wherein a thin layer of graphite crystals is formed on the surface of each of said carbon black particles and 20 to 50% by wt. of an acetylene black, said porous carbon body having a porosity of at least 70%, and a volume of pores having a pore size of 0.1 to 2 $\mu$m occupying not less than 30% of the total pore volume,
   a separator for physically separating said anode and said cathode in said metal can;
   a metal top hermetically sealing an open upper end of said metal can;
   a metal pipe which is inserted in said metal top and which serves as the cathode terminal of said cell and through which an electrolyte containing an oxyhalide is introduced into said metal can; and
   means for sealing said pipe, wherein the level of said electrolyte present in said metal can is lower than the lower end of said metal pipe which is in said metal can.

* * * * *